United States Patent [19]

Yoshimoto

[11] Patent Number: 5,311,307
[45] Date of Patent: May 10, 1994

[54] IMAGE PROCESSING METHOD

[76] Inventor: Masakazu Yoshimoto, c/o Sony Corporation, 7-35, Kitashinagawa 6-chome, Shinagawa-ku, Tokyo, Japan

[21] Appl. No.: 808,167

[22] Filed: Dec. 13, 1991

[30] Foreign Application Priority Data

Dec. 25, 1990 [JP] Japan .................................. 2-413787

[51] Int. Cl.$^5$ ............................................. H04N 7/133
[52] U.S. Cl. ..................................... 348/384; 348/409
[58] Field of Search ............................... 358/133, 135; H04N 7/133

[56] References Cited

U.S. PATENT DOCUMENTS 4,442,454 4/1984 Powell .................................. 358/135

Primary Examiner—Howard W. Britton

[57] ABSTRACT

An image processing method in which an image signal of frames of pixel data is divided to provide a plurality of blocks and the step of dividing the image signal into blocks is comprised of the steps of dividing one frame of the image signal into at least first and second fields, dividing the first and second fields into at least first and second groups alternately for each pixel forming a block from these four groups, and arranging the positions of the divided groups such that boundaries of the divided blocks are not overlapped between the groups.

2 Claims, 5 Drawing Sheets

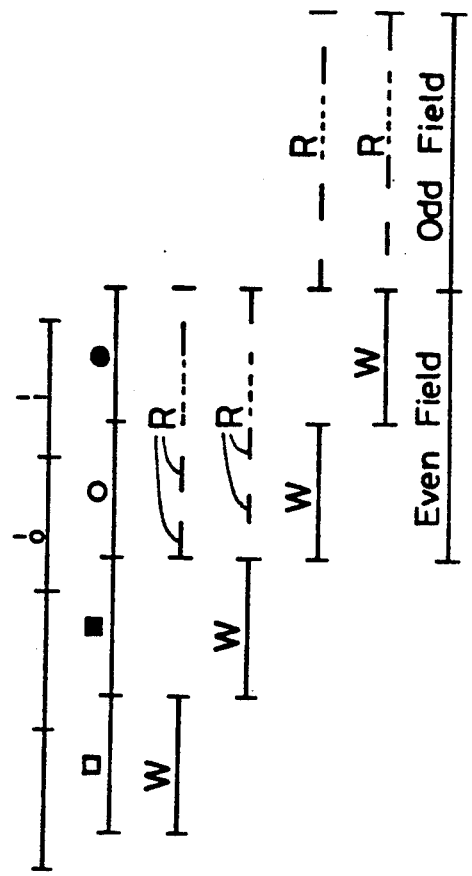

IMAGE PROCESSING METHOD

BACKGROUND OF THE INVENTION

1. Field of the Invention

The present invention generally relates to image processing methods and, more particularly, is directed to an image processing method such as a discrete cosine transform (DCT) encoding method in which an image signal is processed in the form of a plurality of divided blocks or the like.

2. Description of the Prior Art

A discrete cosine transform (DCT) encoding method is known as a method for compressing image information, for example. In accordance with the above DCT encoding method, the image is divided into blocks (N×N) which are formed of N picture elements (pixels) both in the horizontal and vertical directions and the image of each block is processed in a two-dimensional DCT fashion. Then, a transform coefficient of the two-dimensional DCT is quantized. However, if quantization density is made coarse during the DCT encoding, there is then the risk that a distortion will occur on a boundary between the divided blocks.

FIG. 1 shows the case such that an image is divided into blocks (8×8) which are formed of 8 pixels both in the horizontal and vertical directions. In FIG. 1, an open square (□) represents a pixel of even field constructing one frame and an open circle (○) a pixel of odd field. Accordingly, if these blocks are processed in a two-dimensional DCT fashion, then the pixels are transformed in an unrelated fashion because pixels adjoining, for example, at the boundary of the blocks exist within different blocks. As a result, an image signal processed in a reverse transform manner is fluctuated between the blocks, thus causing a distortion to occur in the image.

OBJECTS AND SUMMARY OF THE INVENTION

Therefore, it is an object of the present invention to provide an improved image processing method in which the aforesaid shortcomings and disadvantages encountered with the prior art can be substantially eliminated.

More specifically, it is an object of the present invention to provide an image processing method which can remove the risk of a distortion occurring on an image of a boundary between blocks.

As an aspect of the present invention, in an image processing method in which an image signal composed of frames of pixel data is to be divided to provide a plurality of blocks and the image signal is to be processed at every block, the invention resides in the process of dividing the image signal into the plurality of blocks and processed at every block is comprised of the steps of dividing one frame of the image signal into at least first and second fields, and dividing the first and second fields into at least first and second groups alternating pixel by pixel to provide separate blocks constituted of four groups, i.e. a first group and a second group of a first field and a second field, respectively, and arranging the positions of the divided groups such that boundaries of the divided blocks do not coincide between the groups of different blocks. According to the present invention, the boundaries of blocks are arranged so as not to overlay each other between the groups so that, even if a distortion occurs in one group, no distortion occurs in other groups. Thus, distortions are distributed and an interference can be avoided from a visual standpoint.

The preceding and other objects, features, and advantages of the present invention will become apparent in the following detailed description of an illustrative embodiment thereof when read in conjunction with the accompanying drawings, in which like reference numerals are used to identify the same or similar parts in the several views.

BRIEF DESCRIPTION OF THE DRAWINGS

FIGS. 4A through 4N are respectively timing charts used to explain the operation of the apparatus shown in FIGS. 3A and 3B.

DESCRIPTION OF THE PREFERRED EMBODIMENT

The present invention will now be described with reference to the accompanying drawings.

Figure 1:
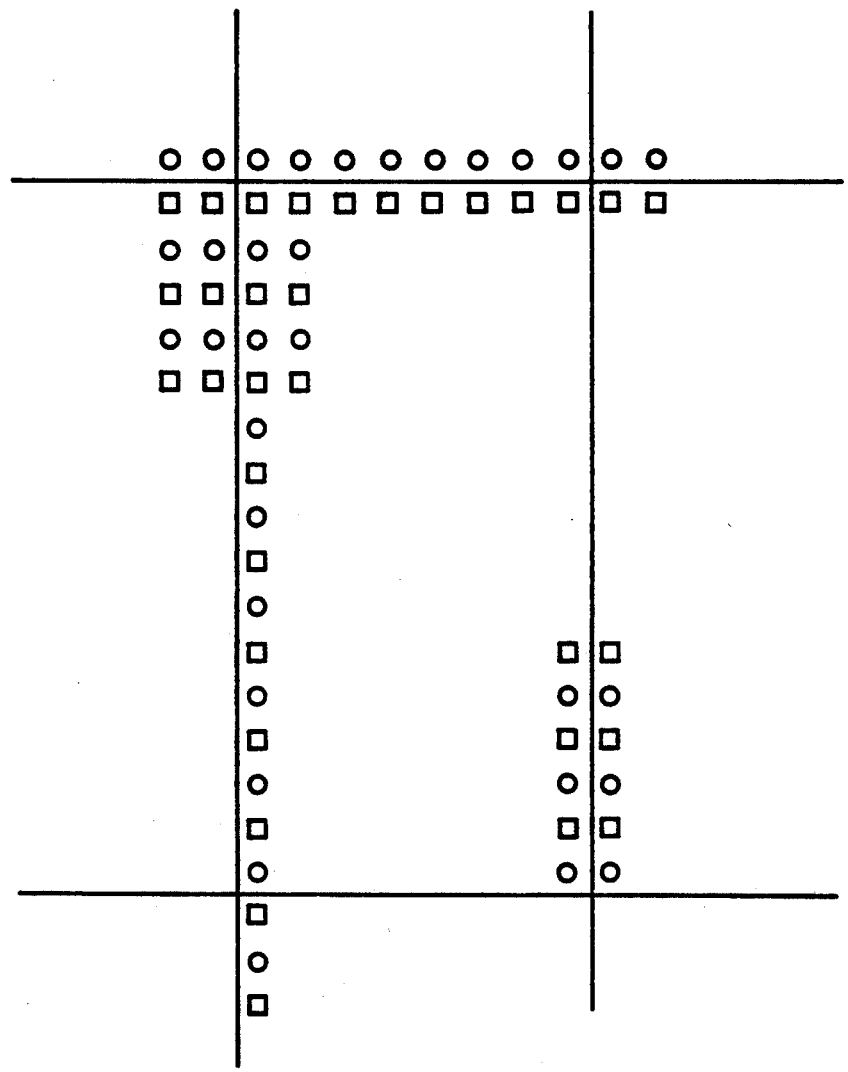
FIG. 1 is a schematic representation used to explain the case such that an image signal is divided into blocks according to an example of the prior art.
Figure 2:
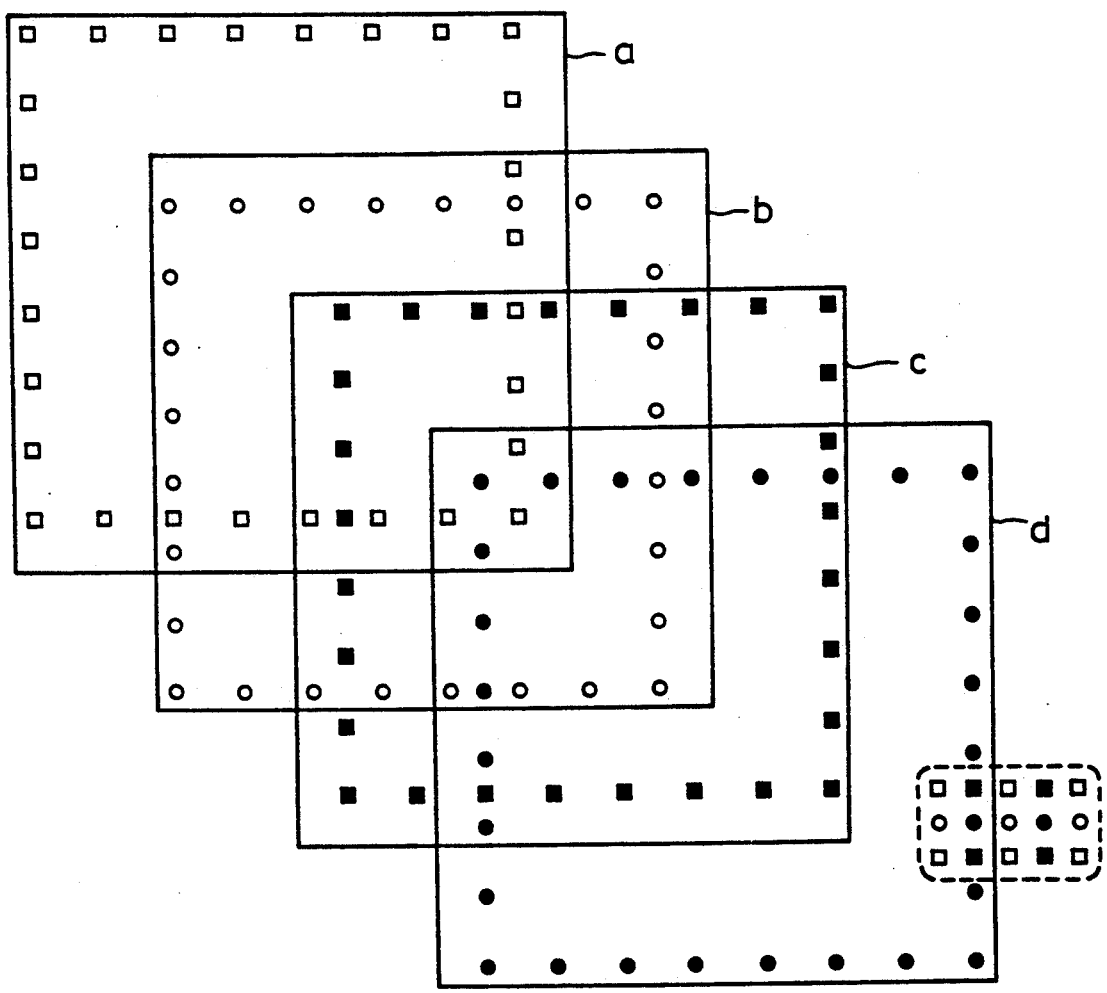
FIG. 2 is a schematic representation used to explain the case such that an image signal is divided into blocks according to an embodiment of the image processing method of the present invention.

FIG. 2 illustrates the case such that an image signal is divided into blocks (8×8) formed of, for example, 8 pixels both in the horizontal and vertical directions.

In FIG. 2, □, ○, ■, ● represent pixels constructing a portion of one frame. As shown in FIG. 2, an image signal of one frame is divided into first (even) and second (odd) fields (□,■/○,●) and the first and second fields are alternately divided into first and second groups (□,○/■,●) the unit of one pixel.

The blocks are divided for groups (□, ○, ■, ●) of every four pixels, in which boundaries a, b, c and d of the divided blocks are located at the positions displaced by 4 pixels each in the horizontal direction and in the vertical direction for all pixels (□, ○, ■, ●) constituting one frame. Thus, the divided positions are determined so as not to make the boundaries a, b, c and d of the divided blocks between the groups coincident (□, ○, ■, ●).

Accordingly, in this method, in the portion of the boundary d shown, for example, by a phantom block in FIG. 2, a distortion on the boundary occurs with respect to two pixels ●. Howevever, the pixels at both sides of the boundary d exist within the same block so that no distortion occurs in other pixels □, ○ and ■.

As described above, according to this method, the boundaries a, b, c and d of the blocks are located so as not to coincide among the groups (□, ○, ■, ●) so that, even if a distortion occurs in one group (●), no distortion occurs in other groups (□, ○, ■). Therefore, distortions are distributed and the image can be prevented from being disturbed from a visual standpoint.

Figure 3A:
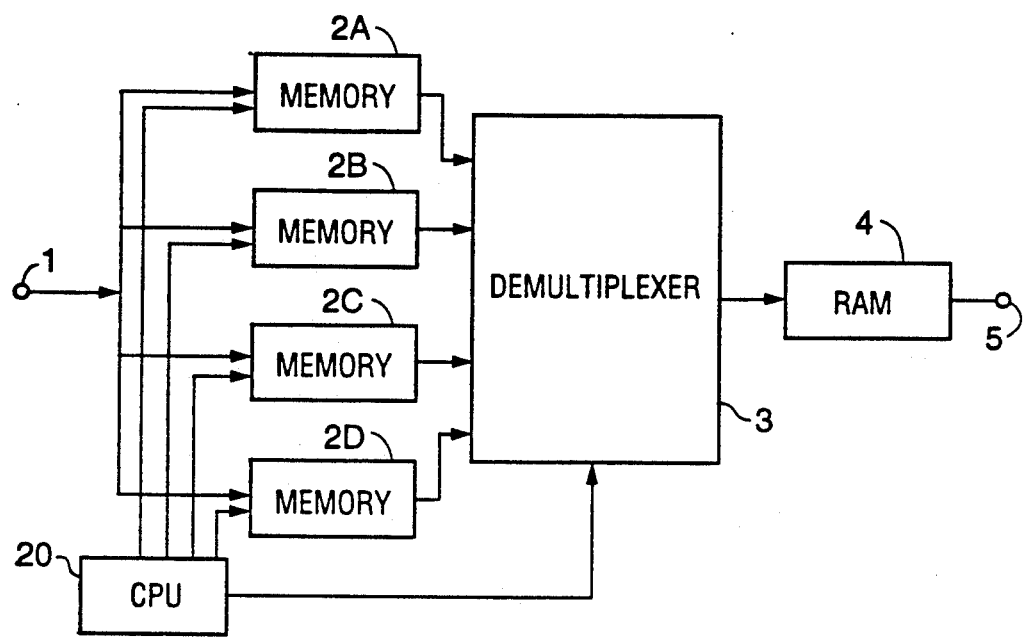
FIGS. 3A and 3B are respectively block diagrams showing an arrangement of an apparatus for dividing an image signal into blocks according to the present invention.
Figure 3B:
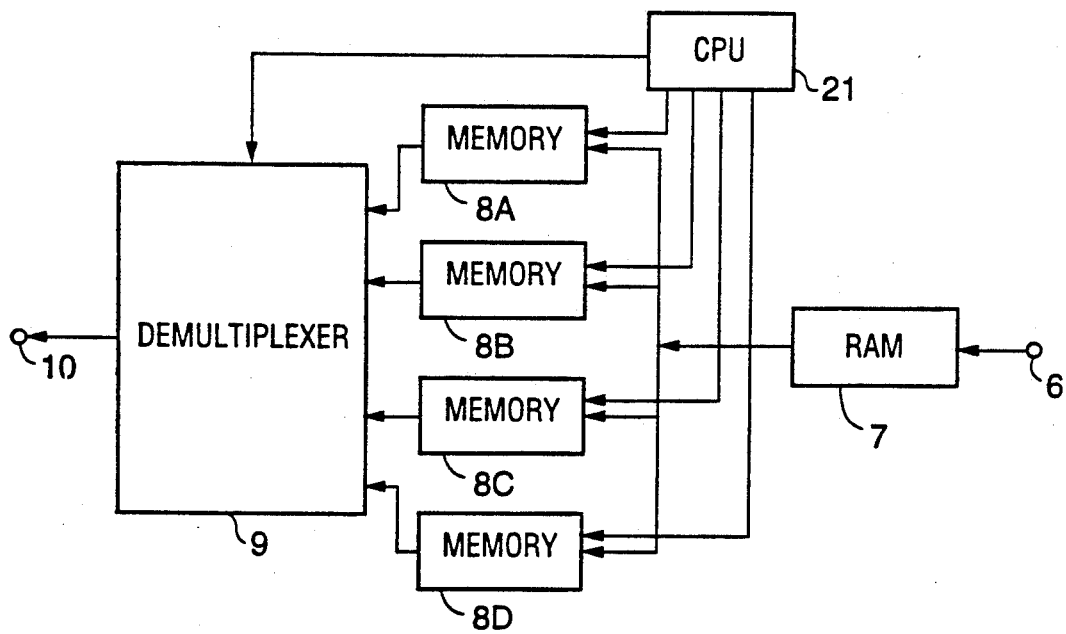

FIGS. 3A and 3B illustrate an example of one such apparatus which realizes the above-mentioned method.

FIG. 3A shows a block diagram of an arrangement which converts an image signal of scanning order into a block. Referring to FIG. 3A, an image signal is supplied to an input terminal 1 in the order of the normal raster scanning, i.e. on a pixel by pixel basis. A signal applied to an input terminal 1 is supplied to memory devices 2a, 2b, 2c, 2d, each formed of a FIFO (first-in first-out) type having a storage capacity of the pixels for ½ field. Signals from these memory devices 2a, 2b, 2c and 2d are supplied to a 4-input and one-output demultiplexer 3. A signal from the demultiplexer 3 is supplied to a random access memory (RAM) 4 and a signal from the RAM 4 is fed to an output terminal 5.

FIG. 3B shows a block diagram of an arrangement which reconverts a blocked signal into an image signal of scanning order. Referring to FIG. 3B, the above-mentioned blocked signal is supplied to an input terminal 6. A signal from the input terminal 6 is supplied to a RAM 7. A signal from the RAM 7 is supplied to memory devices 8a, 8b, 8c and 8d, each formed of an FIFO type having a storage capacity of pixels of ½ field. Signals from these memory devices 8a, 8b, 8c and 8d are supplied to a 4-input and one-output demultiplexer 9 and a signal from the demultiplexer 9 is fed to an output terminal 10.

In the circuits shown in FIGS. 3A and 3B, respective portions are controlled by CPUs 20, 21, respectively as shown in the timing charts forming FIGS. 4A to 4N. FIGS. 4A through 4G illustrate timing charts when the image signal of the scanning order is blocked. FIG. 4A shows a timing of even/odd field of the image signal supplied to the input terminal 1, while FIGS. 4B through 4E show the timings of the write (W) and read (R) of the memory devices 2a, 2b, 2c and 2d, respectively.

The signal from the input terminal 1 is alternately written in the memory devices 2a and 2b at every pixel during the even field period, whereby signals of pixels □, ■ are respectively written in the memory devices 2a and 2b. These signals are successively read out from the memory devices 2a and 2b during the first half and second half periods of the odd field, respectively. Also, during the odd field period, the signal from the input terminal 1 is alternately written in the memory devices 2c and 2d at every pixel, so that the signals of pixels ○, ● are written in the memory devices 2c and 2d, respectively. These signals are successively read out from the memory devices 2c and 2d during the first half and second half periods of the even field, respectively. These signals are supplied to the demultiplexer 3 so that the demultiplexer 3 derives signals of respective groups (□, ■, ○, ●) in a time division manner as shown in FIG. 4F. This signal is written in the RAM 4 and the RAM 4 is read out from a timing point at which signals constructing one column of a block in the horizontal direction are written at every group as shown in FIG. 4G.

FIGS. 4H through 4N are respectively timing charts of signals when the blocked signal is reconverted into an image signal of the scanning order. FIG. 4H shows a timing of respective groups (□, ■, ○, ●) of signal supplied to the input terminal 6, and this signal is written in the RAM 7. Then, the read-out of the RAM 7 is started out from a timing point at which signals constructing one column of a block in the horizontal direction are written as shown in FIG. 4I.

FIGS. 4J through 4M show timings of the write (W) and read (R) of the memory devices 8a, 8b, 8c and 8d, respectively. The signal from the input terminal 6 is successively written in the memory devices 8a, 8b during a period of one group (□, ■), while this signal is alternately read out from the memory devices 8a, 8b at every pixel during a period of the other group (○, ●). Also, during the period of the other group (○, ●), the signal from the input terminal 6 is successively written in the memory devices 8c, 8d. This signal is alternately read out from the memory devices 8c, 8d at every pixel during the period of one group (□, ■). Further, these signals are synthesized by the demultiplexer 9 to produce an image signal of even/odd field as shown in FIG. 4N.

Figure 5:
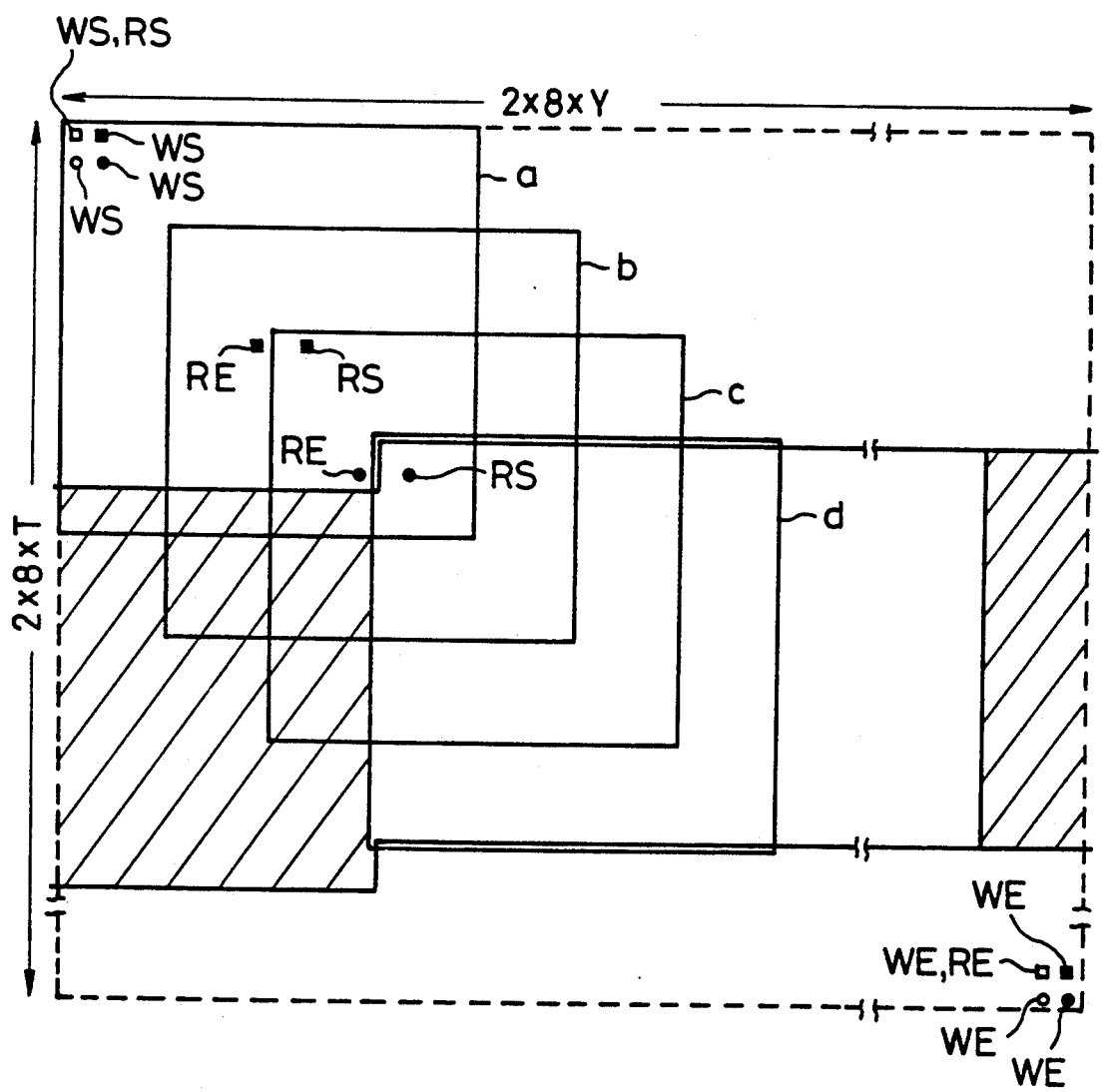
FIG. 5 is a schematic representation used to explain the case such that an image signal is divided into blocks by using the apparatus shown in FIGS. 3A and 3B.

In the above-mentioned circuits, by determining a write starting point (WS), a write ending point (WE), a read starting point (RS) and a read ending point (RE) of respective pixels □, ■, ○, ● in the memory devices 2a, 2b, 2c, 2d and 8a, 8b, 8c, 8d as shown in FIG. 5, the signals are blocked as shown by boundaries a, b, c and d shown in FIG. 5. Further, in this case, the number of pixels in the horizontal and vertical directions constructing one frame is selected to an integral multiple of $2 \times 8 = 16$. As a consequence, the remaining portions produced in the upper, lower, left and right portions of blocks of the frame are combined at upper, lower, left and right portions to form one block as shown by hatched areas of FIG. 5. There is then no problem on the image processing.

According to this invention, the boundaries of the blocks are located so as not to overlap each other between the groups so that, even if a distortion occurs in one group, no distortion occurs in other group, thereby distortions being distributed. Therefore, an interference can be avoided from a visual standpoint.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. An image processing method in which an image signal of frames of pixel data is divided to provide a plurality of blocks for image signal processing on a block by block basis, wherein the step of dividing the image signal into blocks comprises the steps of:

dividing each frame of the image signal into at least first and second fields;

dividing each of the first and second fields into at least first and second groups alternately for each pixel so that four groups are formed;

forming separate blocks from each of the four groups; and arranging the positions of the divided groups such that boundaries of the blocks do not coincide between the groups.

2. An image processing method in which an image signal of frames of pixel data is divided to provide a plurality of blocks for image signal processing on a block by block basis, wherein the step of dividing the image signal into blocks comprises the steps of:

dividing each frame of the image signal into multiple fields;

dividing each of the fields into a predetermined number of groups by sequentially assigning each pixel to one of the groups;

forming different blocks from each of the predetermined number of groups; and arranging the positions of the groups such that boundaries of the blocks do not coincide between the groups.

* * * * *